US008462923B2

(12) United States Patent
Krishnamoorthy et al.

(10) Patent No.: US 8,462,923 B2
(45) Date of Patent: Jun. 11, 2013

(54) REVENUE MANAGEMENT SYSTEMS AND METHODS WITH PAYMENT SUSPENSE MANAGEMENT

(75) Inventors: Jayaprakash Krishnamoorthy, Cupertino, CA (US); David S. Labuda, Palo Alto, CA (US); James R. Haddock, San Francisco, CA (US); Mark S. Goldman, San Jose, CA (US); Prashanth Chowlur, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1233 days.

(21) Appl. No.: 11/760,519

(22) Filed: Jun. 8, 2007

(65) Prior Publication Data

US 2007/0288368 A1    Dec. 13, 2007

Related U.S. Application Data

(62) Division of application No. 11/415,759, filed on May 1, 2006.

(60) Provisional application No. 60/676,327, filed on Apr. 30, 2005.

(51) Int. Cl.
*H04M 15/00*  (2006.01)

(52) U.S. Cl.
USPC ...... 379/114.01; 455/406; 455/407; 455/408; 455/410; 455/411; 455/414.1

(58) Field of Classification Search
USPC .............. 705/35, 40; 455/406, 407, 408, 410, 455/411
See application file for complete search history.

(56) References Cited

U.S. PATENT DOCUMENTS

| 4,430,530 A | 2/1984 | Kandell et al. |
| 4,831,582 A | 5/1989 | Miller et al. |
| 4,849,884 A | 7/1989 | Axelrod et al. |
| 4,868,743 A | 9/1989 | Nishio |
| 4,918,593 A | 4/1990 | Huber |
| 4,968,873 A | 11/1990 | Dethloff et al. |
| 5,006,978 A | 4/1991 | Neches |
| 5,010,485 A | 4/1991 | Bigari |
| 5,036,389 A | 7/1991 | Morales |
| 5,043,872 A | 8/1991 | Cheng et al. |
| 5,163,148 A | 11/1992 | Walls |
| 5,212,787 A | 5/1993 | Baker et al. |
| 5,220,501 A | 6/1993 | Lawlor et al. |
| 5,224,034 A | 6/1993 | Katz et al. |
| 5,241,670 A | 8/1993 | Eastridge et al. |
| 5,291,583 A | 3/1994 | Bapat |
| 5,295,256 A | 3/1994 | Bapat |
| 5,305,389 A | 4/1994 | Palmer |
| 5,313,664 A | 5/1994 | Sugiyama et al. |
| 5,386,413 A | 1/1995 | McAuley et al. |
| 5,426,780 A | 6/1995 | Gerull et al. |
| 5,448,623 A | 9/1995 | Wiedeman et al. |
| 5,448,727 A | 9/1995 | Annevelink |
| 5,450,477 A | 9/1995 | Amarant et al. |
| 5,452,451 A | 9/1995 | Akizawa et al. |
| 5,469,497 A | 11/1995 | Pierce et al. |
| 5,475,585 A | 12/1995 | Bush |
| 5,475,838 A | 12/1995 | Fehskens et al. |
| 5,483,445 A | 1/1996 | Pickering |
| 5,495,609 A | 2/1996 | Scott |
| 5,499,367 A | 3/1996 | Bamford et al. |
| 5,499,371 A | 3/1996 | Henninger et al. |
| 5,504,885 A | 4/1996 | Alashqur |
| 5,506,966 A | 4/1996 | Ban |
| 5,517,555 A | 5/1996 | Amadon et al. |
| 5,523,942 A | 6/1996 | Tyler et al. |
| 5,530,853 A | 6/1996 | Schell et al. |
| 5,544,302 A | 8/1996 | Nguyen |
| 5,548,749 A | 8/1996 | Kroenke et al. |
| 5,555,444 A | 9/1996 | Diekelman |
| 5,560,005 A | 9/1996 | Hoover et al. |
| 5,579,375 A | 11/1996 | Ginter |
| 5,590,395 A | 12/1996 | Diekelman |
| 5,613,012 A | 3/1997 | Hoffman et al. |
| 5,615,109 A | 3/1997 | Eder |
| 5,615,249 A | 3/1997 | Solondz |
| 5,615,362 A | 3/1997 | Jensen et al. |
| 5,627,979 A | 5/1997 | Chang et al. |

(Continued)

FOREIGN PATENT DOCUMENTS

| GB | 63402 A1 | 7/1982 |
| WO | WO 95/04960 A2 | 2/1995 |

(Continued)

OTHER PUBLICATIONS

U.S. Appl. No. 11/760,472, filed Jun. 8, 2007, Office Action mailed Mar. 24, 2011, 7 pages.

(Continued)

*Primary Examiner* — Kamran Afshar
*Assistant Examiner* — Khalid Shaheed
(74) *Attorney, Agent, or Firm* — Kilpatrick Townsend & Stockton LLP

(57) ABSTRACT

A revenue management system for telecommunication systems is disclosed. The revenue management system can have multiple integrated modules. The modules can include a revenue generation module, a revenue capture module, a revenue collection module, a revenue intelligence module, and others. The revenue management system can also be configured to simultaneously manage revenue for prepaid, postpaid, now-paid payment models.

10 Claims, No Drawings

U.S. PATENT DOCUMENTS

| | | |
|---|---|---|
| 5,644,736 A | 7/1997 | Healy et al. |
| 5,649,118 A | 7/1997 | Carlisle et al. |
| 5,666,648 A | 9/1997 | Stuart |
| 5,677,945 A | 10/1997 | Mullins et al. |
| 5,684,965 A | 11/1997 | Pickering |
| 5,694,598 A | 12/1997 | Durand et al. |
| 5,706,516 A | 1/1998 | Chang et al. |
| 5,717,924 A | 2/1998 | Kawai |
| 5,732,400 A | 3/1998 | Mandler et al. |
| 5,737,414 A | 4/1998 | Walker et al. |
| 5,745,754 A | 4/1998 | Lagarde et al. |
| 5,765,159 A | 6/1998 | Srinivasan |
| 5,778,189 A | 7/1998 | Kimura et al. |
| 5,797,137 A | 8/1998 | Golshani et al. |
| 5,799,072 A | 8/1998 | Vulcan et al. |
| 5,799,087 A | 8/1998 | Rosen |
| 5,806,061 A | 9/1998 | Chaudhuri et al. |
| 5,809,503 A | 9/1998 | Aoshima |
| 5,822,747 A | 10/1998 | Graefe et al. |
| 5,832,068 A | 11/1998 | Smith |
| 5,842,220 A | 11/1998 | De Groot et al. |
| 5,845,206 A | 12/1998 | Castiel et al. |
| 5,845,274 A | 12/1998 | Chadha et al. |
| 5,850,544 A | 12/1998 | Parvathaneny et al. |
| 5,852,820 A | 12/1998 | Burrows |
| 5,854,835 A | 12/1998 | Montgomery et al. |
| 5,864,845 A | 1/1999 | Voorhees et al. |
| 5,870,473 A | 2/1999 | Boesch et al. |
| 5,870,724 A | 2/1999 | Lawlor et al. |
| 5,873,093 A | 2/1999 | Williamson et al. |
| 5,875,435 A | 2/1999 | Brown |
| 5,883,584 A | 3/1999 | Langemann et al. |
| 5,884,290 A | 3/1999 | Smorodinsky et al. |
| 5,893,108 A | 4/1999 | Srinivasan et al. |
| 5,898,762 A | 4/1999 | Katz |
| 5,909,440 A | 6/1999 | Ferguson et al. |
| 5,913,164 A | 6/1999 | Pawa et al. |
| 5,915,253 A | 6/1999 | Christiansen |
| 5,920,629 A | 7/1999 | Rosen |
| 5,924,094 A | 7/1999 | Sutter |
| 5,937,406 A | 8/1999 | Balabine et al. |
| 5,960,416 A | 9/1999 | Block |
| 5,963,648 A | 10/1999 | Rosen |
| 5,966,649 A | 10/1999 | Gulliford et al. |
| 5,970,417 A | 10/1999 | Toyryla et al. |
| 5,974,407 A | 10/1999 | Sacks |
| 5,974,441 A | 10/1999 | Rogers et al. |
| 5,974,506 A | 10/1999 | Sicola et al. |
| 5,983,223 A | 11/1999 | Perlman |
| 5,987,233 A | 11/1999 | Humphrey |
| 6,005,926 A | 12/1999 | Mashinsky |
| 6,011,795 A | 1/2000 | Varghese et al. |
| 6,012,057 A | 1/2000 | Mayer et al. |
| 6,016,341 A | 1/2000 | Lim |
| 6,021,409 A | 2/2000 | Burrows |
| 6,032,132 A | 2/2000 | Nelson |
| 6,035,326 A | 3/2000 | Miles et al. |
| 6,041,323 A | 3/2000 | Kubota |
| 6,047,067 A | 4/2000 | Rosen |
| 6,047,267 A | 4/2000 | Owens et al. |
| 6,047,284 A | 4/2000 | Owens et al. |
| 6,058,173 A | 5/2000 | Penfield et al. |
| 6,058,375 A | 5/2000 | Park |
| 6,061,679 A | 5/2000 | Bournas et al. |
| 6,061,763 A | 5/2000 | Rubin et al. |
| 6,067,574 A | 5/2000 | Tzeng |
| 6,070,051 A | 5/2000 | Astrom et al. |
| 6,075,796 A | 6/2000 | Katseff et al. |
| 6,078,897 A | 6/2000 | Rubin et al. |
| 6,092,055 A | 7/2000 | Owens et al. |
| 6,112,190 A | 8/2000 | Fletcher et al. |
| 6,112,304 A | 8/2000 | Clawson |
| 6,141,759 A | 10/2000 | Braddy |
| 6,154,765 A | 11/2000 | Hart |
| 6,170,014 B1 | 1/2001 | Darago et al. |
| 6,185,225 B1 | 2/2001 | Proctor |
| 6,185,557 B1 | 2/2001 | Liu |
| 6,223,172 B1 | 4/2001 | Hunter et al. |
| 6,236,972 B1 | 5/2001 | Shkedy |
| 6,236,988 B1 | 5/2001 | Aldred |
| 6,243,760 B1 | 6/2001 | Armbruster et al. |
| 6,266,660 B1 | 7/2001 | Liu et al. |
| 6,311,185 B1 | 10/2001 | Markowitz et al. |
| 6,311,186 B1 | 10/2001 | MeLampy et al. |
| 6,314,365 B1 | 11/2001 | Smith |
| 6,321,205 B1 | 11/2001 | Eder |
| 6,341,272 B1 | 1/2002 | Randle |
| 6,347,340 B1 | 2/2002 | Coelho et al. |
| 6,351,778 B1 | 2/2002 | Orton et al. |
| 6,356,897 B1 | 3/2002 | Gusack |
| 6,377,938 B1 | 4/2002 | Block et al. |
| 6,377,957 B1 | 4/2002 | Jeyaraman |
| 6,381,228 B1 | 4/2002 | Prieto et al. |
| 6,381,605 B1 | 4/2002 | Kothuri et al. |
| 6,381,607 B1 | 4/2002 | Wu et al. |
| 6,400,729 B1 | 6/2002 | Shimadoi et al. |
| 6,400,925 B1 | 6/2002 | Tirabassi et al. |
| 6,401,098 B1 | 6/2002 | Moulin |
| 6,415,323 B1 | 7/2002 | McCanne et al. |
| 6,427,172 B1 | 7/2002 | Thacker et al. |
| 6,429,812 B1 | 8/2002 | Hoffberg |
| 6,442,652 B1 | 8/2002 | Laboy et al. |
| 6,446,068 B1 | 9/2002 | Kortge |
| 6,477,651 B1 | 11/2002 | Teal |
| 6,481,752 B1 | 11/2002 | DeJoseph |
| 6,490,592 B1 | 12/2002 | St. Denis et al. |
| 6,494,367 B1 | 12/2002 | Zacharias |
| 6,529,915 B1 | 3/2003 | Owens et al. |
| 6,532,283 B1 | 3/2003 | Ingram |
| 6,553,336 B1 | 4/2003 | Johnson et al. |
| 6,563,800 B1 | 5/2003 | Salo et al. |
| 6,564,047 B1 | 5/2003 | Steele et al. |
| 6,564,247 B1 | 5/2003 | Todorov |
| 6,567,408 B1 | 5/2003 | Li et al. |
| 6,658,415 B1 | 12/2003 | Brown et al. |
| 6,658,463 B1 | 12/2003 | Dillon et al. |
| 6,662,180 B1 | 12/2003 | Aref et al. |
| 6,662,184 B1 | 12/2003 | Friedberg |
| 6,678,675 B1 | 1/2004 | Rothrock |
| 6,700,869 B1 | 3/2004 | Falco et al. |
| 6,725,052 B1 | 4/2004 | Raith |
| 6,735,631 B1 | 5/2004 | Oehrke et al. |
| 6,804,337 B1 | 10/2004 | Anderson et al. |
| 6,901,507 B2 | 5/2005 | Wishneusky |
| 6,907,429 B2 | 6/2005 | Carneal et al. |
| 6,947,440 B2 | 9/2005 | Chatterjee et al. |
| 6,950,867 B1 | 9/2005 | Strohwig et al. |
| 6,973,057 B1 | 12/2005 | Forslow |
| 6,999,569 B2 | 2/2006 | Risafi et al. |
| 7,003,280 B2 | 2/2006 | Pelaez et al. |
| 7,058,773 B1 | 6/2006 | Frye, Jr. et al. |
| 7,089,262 B2 | 8/2006 | Owens et al. |
| 7,181,537 B2 | 2/2007 | Costa-Requena et al. |
| 7,197,301 B2 * | 3/2007 | Netanel .................. 455/419 |
| 7,233,918 B1 | 6/2007 | Ye et al. |
| 7,246,102 B2 | 7/2007 | McDaniel et al. |
| 7,257,611 B1 | 8/2007 | Shankar et al. |
| 7,391,784 B1 | 6/2008 | Renkel |
| 7,395,262 B1 | 7/2008 | Rothrock |
| 7,406,471 B1 | 7/2008 | Shankar et al. |
| 7,729,925 B2 | 6/2010 | Maritzen et al. |
| 7,792,714 B1 | 9/2010 | Mills et al. |
| 8,102,980 B2 | 1/2012 | Krishnamoorthy et al. |
| 8,116,326 B2 | 2/2012 | Rockel et al. |
| 8,117,358 B2 | 2/2012 | Labuda et al. |
| 8,223,935 B2 | 7/2012 | Krishnamoorthy et al. |
| 2001/0005372 A1 | 6/2001 | Cave et al. |
| 2001/0025273 A1 | 9/2001 | Walker et al. |
| 2001/0034704 A1 | 10/2001 | Farhat et al. |
| 2001/0056362 A1 | 12/2001 | Hanagan et al. |
| 2002/0059163 A1 | 5/2002 | Smith |
| 2002/0073082 A1 | 6/2002 | Duviller et al. |
| 2002/0082881 A1 | 6/2002 | Price et al. |
| 2002/0087469 A1 * | 7/2002 | Ganesan et al. .................. 705/40 |
| 2002/0106064 A1 | 8/2002 | Bekkevold et al. |
| 2003/0014361 A1 * | 1/2003 | Klatt et al. .................. 705/40 |
| 2003/0014656 A1 | 1/2003 | Ault et al. |

| | | | |
|---|---|---|---|
| 2003/0061537 | A1 | 3/2003 | Cha et al. |
| 2003/0076940 | A1 | 4/2003 | Manto |
| 2003/0078056 | A1 | 4/2003 | Takatori et al. |
| 2003/0097547 | A1 | 5/2003 | Wishneusky |
| 2003/0105799 | A1 | 6/2003 | Khan et al. |
| 2003/0118039 | A1 | 6/2003 | Nishi et al. |
| 2003/0133552 | A1 | 7/2003 | Pillai et al. |
| 2003/0172145 | A1 | 9/2003 | Nguyen |
| 2003/0202521 | A1 | 10/2003 | Havinis et al. |
| 2003/0202638 | A1 | 10/2003 | Eringis et al. |
| 2004/0002918 | A1* | 1/2004 | McCarthy et al. ............. 705/40 |
| 2004/0018829 | A1 | 1/2004 | Raman et al. |
| 2004/0062106 | A1 | 4/2004 | Ramesh et al. |
| 2004/0073500 | A1 | 4/2004 | Owen et al. |
| 2004/0132427 | A1* | 7/2004 | Lee et al. ...................... 455/406 |
| 2004/0153407 | A1 | 8/2004 | Clubb et al. |
| 2005/0018689 | A1 | 1/2005 | Chudoba |
| 2005/0026558 | A1 | 2/2005 | Stura et al. |
| 2005/0033847 | A1 | 2/2005 | Roy |
| 2005/0036487 | A1 | 2/2005 | Srikrishna |
| 2005/0065880 | A1 | 3/2005 | Amato et al. |
| 2005/0075957 | A1 | 4/2005 | Pincus et al. |
| 2005/0091156 | A1 | 4/2005 | Hailwood et al. |
| 2005/0107066 | A1 | 5/2005 | Erskine et al. |
| 2005/0113062 | A1 | 5/2005 | Pelaez et al. |
| 2005/0120350 | A1 | 6/2005 | Ni et al. |
| 2005/0125305 | A1 | 6/2005 | Benco et al. |
| 2005/0144099 | A1 | 6/2005 | Deb et al. |
| 2005/0187841 | A1* | 8/2005 | Grear et al. ..................... 705/35 |
| 2005/0238154 | A1 | 10/2005 | Heaton et al. |
| 2006/0010057 | A1 | 1/2006 | Bradway et al. |
| 2006/0015363 | A1 | 1/2006 | Allu et al. |
| 2006/0035637 | A1 | 2/2006 | Westman |
| 2006/0045250 | A1 | 3/2006 | Cai et al. |
| 2006/0056607 | A1 | 3/2006 | Halkosaari |
| 2006/0148446 | A1 | 7/2006 | Karlsson |
| 2006/0168303 | A1 | 7/2006 | Oyama et al. |
| 2006/0190478 | A1 | 8/2006 | Owens et al. |
| 2006/0248010 | A1 | 11/2006 | Krishnamoorthy et al. |
| 2006/0251226 | A1 | 11/2006 | Hogan et al. |
| 2007/0091874 | A1 | 4/2007 | Rockel |
| 2007/0100981 | A1 | 5/2007 | Adamczyk et al. |
| 2007/0110083 | A1 | 5/2007 | Krishnamoorthy et al. |
| 2007/0133575 | A1 | 6/2007 | Cai et al. |
| 2007/0198283 | A1 | 8/2007 | Labuda |
| 2007/0288367 | A1 | 12/2007 | Krishnamoorthy et al. |
| 2008/0033873 | A1 | 2/2008 | Krishnamoorthy et al. |
| 2008/0033874 | A1 | 2/2008 | Krishnamoorthy et al. |
| 2008/0040267 | A1 | 2/2008 | Krishnamoorthy et al. |
| 2008/0126230 | A1 | 5/2008 | Bellora et al. |
| 2008/0215474 | A1 | 9/2008 | Graham |
| 2008/0311883 | A1 | 12/2008 | Bellora et al. |

FOREIGN PATENT DOCUMENTS

| | | |
|---|---|---|
| WO | WO 95/27255 A1 | 10/1995 |
| WO | WO 96/34350 A1 | 10/1996 |
| WO | WO 97/03406 A1 | 1/1997 |
| WO | WO 98/52131 A1 | 11/1998 |
| WO | WO 2007/002841 A2 | 1/2007 |
| WO | WO 2007/016412 A2 | 2/2007 |

OTHER PUBLICATIONS

U.S. Appl. No. 11/760,493, filed Jun. 8, 2007, Office Action mailed Mar. 30, 2011, 9 pages.
U.S. Appl. No. 11/760,505, filed Jun. 8, 2007, Office Action mailed Apr. 4, 2011, 7 pages.
U.S. Appl. No. 11/415,759, filed May 1, 2006, Advisory Action mailed Jan. 26, 2011, 3 pages.
U.S. Appl. No. 11/478,558, filed Jun. 28, 2006, Final Office Action mailed May 19, 2011, 15 pages.
U.S. Appl. No. 11/760,427, filed Jun. 8, 2007, Office Action mailed Apr. 8, 2011, 19 pages.
Fiore, M., et al., "Oracle Applications Concepts, Release 11 for UNIX," Oracle Corporation, 1998, 90 pgs.
U.S. Appl. No. 11/496,057, filed Jul. 28, 2006, Notice of Allowance mailed Jun. 13, 2011, 9 pages.
U.S. Appl. No. 11/760,427, filed Jun. 8, 2007, Final Office Action mailed Sep. 27, 2011, 18 pages.
U.S. Appl. No. 11/478,558, filed Jun. 28, 2006, Notice of Allowance mailed Oct. 6, 2011, 9 pages.
U.S. Appl. No. 11/496,057, filed Jul. 28, 2006, Notice of Allowance mailed Oct. 6, 2011, 11 pages.
U.S. Appl. No. 11/760,472, filed Jun. 8, 2007, Final Office Action mailed Sep. 28, 2011, 8 pages.
U.S. Appl. No. 11/760,493, filed Jun. 8, 2007, Notice of Allowance mailed Sep. 20, 2011, 5 pages.
U.S. Appl. No. 11/760,505, filed Jun. 8, 2007, Final Office Action mailed Oct. 17, 2011, 9 pages.
U.S. Appl. No. 11/760,427, filed Jun. 8, 2007, Advisory Action mailed Dec. 7, 2011, 4 pages.
U.S. Appl. No. 11/415,759, filed May 1, 2006, Notice of Allowance mailed Mar. 14, 2012, 5 pages.
U.S. Appl. No. 11/760,472, filed Jun. 8, 2007, Advisory Action mailed Dec. 5, 2011, 3 pages.
U.S. Appl. No. 11/760,505, filed Jun. 8, 2007, Advisory Action malied Jan. 13, 2012, 2 pages.
U.S. Appl. No. 11/415,759, filed May 1, 2006, Final Office Action mailed Nov. 17, 2010, 9 pages.
U.S. Appl. No. 11/496,057, filed Jul. 28, 2006, Final Office Action mailed Jan. 4, 2011,17 pages.
U.S. Appl. No. 11/496,057, filed Jul. 28, 2006, Advisory Action mailed Mar. 9, 2011, 3 pages.
U.S. Appl. No. 11/478,558, filed Jun. 28, 2006, Office Action mailed Oct. 21, 2010, 12 pages.
U.S. Appl. No. 11/496,057, filed Jul. 28, 2006, Office Action mailed Jul. 21, 2010, 23 pages.
U.S. Appl. 11/760,427, filed Jun. 8, 2007, Advisory Action mailed Aug. 30, 2010, 3 pages.
U.S. Appl. No. 11/760,427, filed Jun. 8, 2007, Final Office Action mailed Jun. 25, 2010, 13 pages.
Agarwal et al., "Architecting Object Applications for High Performance With Relational Databases", Aug. 10, 1995, pp. 1-8.
Black, "Real-Time Fraud Management", Billing World, Jul./Aug. 1999; pp. 3.
Blaha, Michael R. et al., "Relational Database Design Using an Object Oriented Methodology", Communication of the ACM, Apr. 1988, vol. 31, No. 4, pp. 414-427.
Borland's Paradox for Windows User Guide, Version 5.0, Borland International, Inc., 1994, 185 pages.
Chenho, Kung, "Object Subclass Hierarchy in SQL: A Simple Approach", Jul. 1990, Communications of the ACM, vol. 33, No. 7, pp. 117-125.
Chester, Thomas et al., Mastering Excel 97, 4th Ed., Sybex Inc., Alameda, CA, 1997, 200 pages.
Davis, Charles, "Online Financing to Boost Procurement", Electronic Payments International, p. 14, Feb. 2000, 3 pages total.
Derfler, Frank J. et al., "How Networks Work", Millenium Ed., Que Corporation, Jan. 2000, 249 pages (2 pdf attachments).
Gavron, Jacquelyn et al., "How to Use Microsoft Windows NT 4 Workstation", MacMillan Computer Publishing, USA, 1996, 25 pages.
Gomez-Perez et al., "Towards a Method to Conceptualize Domain Ontologies", Workshop on Ontological Engineering, ECAI'96, Budapest, Aug. 12, 1996, pp. 41-51.
Gralla, Preston, "How the Internet Works", Millenium Ed., Que Corporation, Aug. 1999, 357 pages (2 pdf attachments).
Horngren, Charles T. et al., "Introduction to Financial Accounting", Revised 3rd Ed., Prentice-Hall, Inc., 1988, 561 pages.
Iannella et al., "Metadata: Enabling the Internet", Jan. 1997, Research Data Network CRC, pp. 1-7.
Muller, Nathan J., "Desktop Encyclopedia of the Internet", Artech House, Inc., 1998, 602 pgs (2 pdf attachments).
Peachtree, "Using General Ledger User Guide", Peachtree Software, Inc., 1989, 319 pages.
St. Pierre et al., "Issues in Crosswalking Content Metadata Standasrds", Oct. 15, 1998, National Information Standards Organization, pp. 1-8.
PR Newswire, "Regions to Offer Secure Internet Banking from Security First Technologies", Apr. 3, 1997, p. 0403ATTH003, 3 pgs.
Reinwald et al., "Storing and Using Objects in a Relational Database", IBM Systems Journal, vol. 35, No. 2, May 1996, pp. 172-191.

Riley, David D., "Data Abstraction and Structures: An Introduction to Computer Science II", Boyd and Fraser Publishing Company, 1987, 30 pages.
Search Report and Written Opinion for Application PCT/US06/29571, mailed on Apr. 16, 2007; 10 pages.
Search Report for Application PCT/US06/25405, mailed on Apr. 3, 2008, 2 pages.
Shah, Ashwin V. et al., "DSM: An Object-Relationship Modeling Language", OOPSLA '89, Oct. 1-6, 1989, pp. 181-202.
Syverson, Nancy, "Inside Graybar: A Profile of the Nation's Top Electrical Distributor", Industrial Maintenance and Plant Operation, vol. 61, No. 11, p. 14, Nov. 2000, 4 pages total.
U.S. Appl. No. 09/569,097, filed May 10, 2000, Advisory Action mailed May 11, 2009, 3 pages.
U.S. Appl. No. 09/569,097, filed May 10, 2000, Advisory Action mailed May 6, 2008, 3 pages.
U.S. Appl. No. 09/569,097, filed May 10, 2000, Advisory Action mailed Jun. 24, 2004, 2 pages.
U.S. Appl. No. 09/569,097, filed May 10, 2000, Final Office Action mailed Jan. 28, 2004, 8 pages.
U.S. Appl. No. 09/569,097, filed May 10, 2000, Final Office Action mailed Feb. 11, 2008, 6 pages.
U.S. Appl. No. 09/569,097, filed May 10, 2000, Final Office Action mailed Mar. 4, 2009, 8 pages.
U.S. Appl. No. 09/569,097, filed May 10, 2000, Final Office Action mailed Jun. 16, 2005, 16 pages.
U.S. Appl. No. 09/569,097, filed May 10, 2000, Notice of Allowance mailed Mar. 5, 2010, 9 pages.
U.S. Appl. No. 09/569,097, filed May 10, 2000, Office Action mailed Oct. 7, 2002, 6 pages.
U.S. Appl. No. 09/569,097, filed May 10, 2000, Office Action mailed Oct. 7, 2004, 12 pages.
U.S. Appl. No. 09/569,097, filed May 10, 2000, Office Action mailed Jul. 3, 2003, 7 pages.
U.S. Appl. No. 09/569,097, filed May 10, 2000, Office Action mailed Aug. 9, 2007, 8 pages.
U.S. Appl. No. 09/569,097, filed May 10, 2000, Office Action mailed Sep. 1, 2009, 6 pages.
U.S. Appl. No. 09/569,097, filed May 10, 2000, Office Action mailed Sep. 3, 2008, 6 pages.
U.S. Appl. No. 11/414,072, filed Apr. 27, 2006, Advisory Action mailed Jan. 9, 2009, 3 pages.
U.S. Appl. No. 11/414,072, filed Apr. 27, 2006, Advisory Action mailed Dec. 28, 2009, 3 pages.
U.S. Appl. No. 11/414,072, filed Apr. 27, 2006, Final Office Action mailed Oct. 16, 2009, 19 pages.
U.S. Appl. No. 11/414,072, filed Apr. 27, 2006, Final Office Action mailed Oct. 23, 2008, 21 pages.
U.S. Appl. No. 11/414,072, filed Apr. 27, 2006, Office Action mailed Mar. 24, 2009, 16 pages.
U.S. Appl. No. 11/414,072, filed Apr. 27, 2006, Office Action mailed Apr. 24, 2008, 33 pages.
U.S. Appl. No. 11/415,759, filed May 1, 2006, Office Action mailed Mar. 30, 2010, 9 pages.
U.S. Appl. No. 11/559,969, filed Nov. 15, 2006, Office Action mailed Oct. 2, 2009, 11 pages.
U.S. Appl. No. 11/559,969, filed Nov. 15, 2006, Office Action mailed Mar. 31, 2010, 13 pages.
U.S. Appl. No. 11/559,969, filed Nov. 15, 2006, Office Action mailed Mar. 5, 2009, 11 pages.
U.S. Appl. No. 11/760,427, filed Jun. 8, 2007, Office Action mailed Dec. 11, 2009, 13 pages.
White, Ron, "How Computers Work", Millenium Ed., Que Corporation, Sep. 1999, 322 pages (2 pdf attachments).
Oracle Applications, Concepts, Release 11 for UNX, Apr. 1998, 90 pgs.
Oracle Server Distribution Systems, vol. II: Replicated Data, Release 7.3, Feb. 1996, 469 pgs.
Skold, Martin, "QDB—A Query Processor for the High Performance, Parallel Data Server NDB Cluster", Linkopings University, Sweden, Apr. 1999, 28 pgs.
U.S. Appl. No. 09/967,493, filed Sep. 27, 2001, Office Action mailed Jan. 14, 2004, 15 pages.
U.S. Appl. No. 09/967,493, filed Sep. 27, 2001, Office Action mailed Oct. 2, 2004, 22 pages.
U.S. Appl. No. 09/967,493, filed Sep. 27, 2001, Final Office Action mailed Aug. 19, 2005, 23 pages.
U.S. Appl. No. 09/967,493, filed Sep. 27, 2001, Office Action mailed May 16, 2006, 26 pages.
U.S. Appl. No. 09/967,493, filed Sep. 27, 2001, Petition Decision mailed Dec. 18, 2006, 1 page.
U.S. Appl. No. 09/967,493, filed Sep. 27, 2001, Final Office Action mailed Dec. 19, 2006, 33 pages.
U.S. Appl. No. 09/967,493, filed Sep. 27, 2001, Office Action mailed Sep. 11, 2007, 15 pages.
U.S. Appl. No. 09/967,493, filed Sep. 27, 2001, Notice of Allowance mailed Apr. 11, 2008, 12 pages.
U.S. Appl. No. 10/394,409, filed Mar. 21, 2003, Office Action mailed Sep. 1, 2006, 9 pages.
U.S. Appl. No. 10/394,409, filed Mar. 21, 2003, Final Office Action mailed Feb. 22, 2007, 13 pages.
U.S. Appl. No. 10/394,409, filed Mar. 21, 2003, Advisory Action mailed May 2, 2007, 3 pages.
U.S. Appl. No. 10/394,409, filed Mar. 21, 2003, Office Action mailed Aug. 3, 2007, 11 pages.
U.S. Appl. No. 10/394,409, filed Mar. 21, 2003, Office Action mailed Feb. 21, 2008, 21 pages.
U.S. Appl. No. 10/394,409, filed Mar. 21, 2003, Final Office Action mailed Sep. 29, 2008, 19 pages.
U.S. Appl. No. 10/394,409, filed Mar. 21, 2003, Advisory Action mailed Jan. 23, 2009, 3 pages.
U.S. Appl. No. 10/394,409, filed Mar. 21, 2003, Office Action mailed Mar. 4, 2009, 13 pages.
U.S. Appl. No. 10/394,409, filed Mar. 21, 2003, Final Office Action mailed Aug. 19, 2009, 11 pages.
U.S. Appl. No. 10/394,409, filed Mar. 21, 2003, Advisory Action mailed Oct. 23, 2009, 3 pages.
U.S. Appl. No. 10/375,694, filed Feb. 26, 2003, Office Action mailed Sep. 7, 2004, 12 pages.
U.S. Appl. No. 10/375,694, filed Feb. 26, 2003, Final Office Action mailed May 13, 2005, 13 pages.
U.S. Appl. No. 10/375,694, filed Feb. 26, 2003, Office Action mailed Oct. 13, 2005, 9 pages.
U.S. Appl. No. 10/375,694, filed Feb. 26, 2003, Notice of Allowance mailed Apr. 3, 2006, 4 pages.
U.S. Appl. No. 10/706,151, filed Feb. 26, 2003, Office Action mailed Oct. 20, 2004, 4 pages.
U.S. Appl. No. 10/706,151, filed Feb. 26, 2003, Final Office Action mailed May 13, 2005, 6 pages.
U.S. Appl. No. 10/706,151, filed Feb. 26, 2003, Office Action mailed Sep. 16, 2005, 7 pages.
U.S. Appl. No. 10/706,151, filed Feb. 26, 2003, Final Office Action mailed Mar. 23, 2006, 9 pages.
U.S. Appl. No. 10/706,151, filed Feb. 26, 2003, Office Action mailed Oct. 10, 2007, 5 pages.
U.S. Appl. No. 10/706,151, filed Feb. 26, 2003, Notice of Allowance mailed Apr. 18, 2008, 8 pages.
U.S. Appl. No. 09/562,785, filed May 2, 2000, Office Action mailed Feb. 17, 2004, 10 pages.
U.S. Appl. No. 09/562,785, filed May 2, 2000, Final Office Action mailed Sep. 27, 2004, 18 pages.
U.S. Appl. No. 09/562,785, filed May 2, 2000, Office Action mailed Jul. 25, 2006, 18 pages.
U.S. Appl. No. 09/562,785, filed May 2, 2000, Final Office Action mailed Jan. 11, 2007, 17 pages.
U.S. Appl. No. 09/562,785, filed May 2, 2000, Advisory Action mailed Mar. 26, 2007, 3 pages.
U.S. Appl. No. 09/562,785, filed May 2, 2000, Notice of Allowance mailed May 21, 2007, 7 pages.
U.S. Appl. No. 09/617,590, filed Jul. 18, 2000, Office Action mailed Feb. 17, 2004, 10 pages.
U.S. Appl. No. 09/617,590, filed Jul. 18, 2000, Office Action mailed Nov. 16, 2004, 11 pages.
U.S. Appl. No. 09/617,590, filed Jul. 18, 2000, Final Office Action mailed Jun. 14, 2005, 10 pages.

U.S. Appl. No. 09/617,590, filed Jul. 18, 2000, Office Action mailed Jul. 25, 2006, 9 pages.
U.S. Appl. No. 09/617,590, filed Jul. 18, 2000, Office Action mailed Sep. 27, 2006, 9 pages.
U.S. Appl. No. 09/617,590, filed Jul. 18, 2000, Notice of Allowance mailed Mar. 27, 2006, 10 pages.

* cited by examiner

REVENUE MANAGEMENT SYSTEMS AND METHODS WITH PAYMENT SUSPENSE MANAGEMENT

CROSS-REFERENCE TO RELATED APPLICATIONS

This application is a divisional application of and claims priority to U.S. patent application Ser. No. 11/415,759, filed May 1, 2006 by Jayaprakash Krishnamoorthy et al and entitled "REVENUE MANAGEMENT SYSTEMS AND METHODS", which claims priority to and incorporates by reference U.S. Provisional Patent Application No. 60/676,327, filed Apr. 30, 2005, both of which are incorporated herein by reference, in their entirety for all purposes.

BACKGROUND OF THE INVENTION

1. Field of the Invention

This invention relates to systems and methods for revenue management. Specifically, this invention related to revenue management for telecommunication systems.

2. Summary of the Related Art

Telecommunications account management is coordinated by software on servers in data communication with the telecommunications network. On the simplest level, these revenue management servers track user accounts, managing balances and preparing bills. With the development of various telecommunication services and service plans, account management has grown in complexity in recent years. Providers of telecommunications services desire revenue management software that can manage the complex services and service plans, and can also provide intelligent analysis and feedback to improve customer satisfaction and fiscal performance.

Revenue management software modules often are configured to handle individual applications. When various software modules are assembled as a whole package, the modules are not originally intended to be used with each other, reducing efficiencies, if even workable at all.

Furthermore, revenue management systems fail to provide detailed analysis of the user base and provide feedback to help coordinate future actions from the service provider.

BRIEF SUMMARY OF THE INVENTION

A system for managing revenue on a telecommunications network is disclosed. The telecommunications network can be wired or wireless.

A system for managing revenue from complex subscriber groups, (e.g., corporate subscribers) is disclosed. The system can be configured to simultaneously manage revenue for prepaid, postpaid, now-paid payment models. The system can manage revenue from third-party settlements.

The system can manage revenue from flexible pricing and rating of bundles of services of voice, data, and content. The system can manage revenue from communications based on the originating source and content partner of the content. The system can also manage revenue from systems needing differentiation with text/SMS pricing and free voice call bundles.

The system can maintain a network agnostic position. A network agnostic position is the ability to operate over any network (e.g., IP and circuit-switched, fixed and mobile, voice, or data).

The system can have a revenue intelligence module. The revenue intelligence module can predict results for various revenue models. The revenue intelligence module can identify price plan optimization, opportunities for cost controls, and define services recommended for the market.

DETAILED DESCRIPTION

A revenue management system is disclosed. The revenue management system can be configured for managing usage of networks (e.g., voice, data, energy). The revenue management system can monitor user accounts stored in a database. The database can be in data communication with the revenue management system. The revenue management system can be made from computer hardware (e.g., within a network server) and/or software (e.g., operating on a network server). The revenue management system can have one or more modules. The modules can be function-specific computer hardware and/or software.

The revenue management system can be used for telecommunications and other data-based services. The revenue management system can be multi-module and also fully convergent on a single platform solution. The revenue management system can provide a fully convergent system allowing subscribers to have both prepaid and postpaid payment methods within a single account.

The revenue management system can have a real-time interactive mode for time-critical, high performance, always available elements. For less time critical activities, the revenue management system processes these activities in a high performance batch processing interface. The revenue management system can have central revenue management functions for "back office" functions, such as customer management and financial reporting.

The revenue management system can have a real-time platform. The real-time platform can retrieve data from current operations for analysis or other review. The real-time platform can provide a single customer view across all services, with fall data integrity.

The revenue management system can have a revenue generation module, a revenue capture module, a revenue collection module, a revenue intelligence module, a balance management module, or combinations thereof.

All of the modules can analyze the database and the service-provider trends or requests and/or customer usage trends to produce results and conclusions described herein.

Revenue Generation Module

The revenue generation module can enables services to be delivered to customers, optimally priced for the user, service provider, and service provider's partners. The revenue generation module provides real-time access to customer data. Therefore, service providers can respond quickly to changing market conditions by rapidly introducing competitive products and services, ensuring they retain the most profitable customers.

The revenue generation module can define pricing, promotions, and service bundles with a unified pricing interface. The revenue generation module can provide customers one tool and one process for any payment method. The revenue generation module can support one-time, non-recurring events (e.g., registration/cancellation charges, commerce, content, various service usage) as well as prepaid support for recurring events of varying duration (e.g., weekly, monthly, multi-monthly, and annual events), tiered, volume, multi-service discounting options as well as user-defined discounting.

For example, the revenue generation module can create discounting based on times of the day and/or days of the week, group pricing options such as closed users groups and friends and family, time and/or calling zone-and locationbased pricing, transport-based (e.g., per minute, per kilobytes) pricing, value-based (e.g., per ring tone, per game, per message) pricing or combinations thereof.

The revenue generation module can define proration rules. The revenue generation module can define the linkage between products and services to entries in the general ledger (G/L).

The revenue generation module can capture and fulfill orders promptly. Orders for prepaid wireless service: include order entry, customer inquiries, disputes, payments, vouchers, and combinations thereof.

The revenue generation module can assign one or more SIM/ESN numbers to an account. The revenue generation module can perform number management with support for number portability.

The revenue generation module can enable viewing (e.g., over the internet) of real-time updates of all balances and activity related to service usage. The revenue generation module can enable customers to self-manage their services, balances, payments, and top-ups through telephone and/or internet-based interfaces.

The revenue generation module can support multiple-languages. The revenue generation module can perform a complete audit trail of all usage and CSR activity. The revenue generation module can calculate revenue sharing with partners and settlement processing for network, content, roaming, or any other partner arrangement. The revenue generation module can handle multiple partner rules (e.g., rules where each partner has its own agreement within which individual rules for revenue share calculations apply).

The revenue generation module can offer real-time, leakage-free access to third party content and applications-secure connections between third parties and the service provider including preauthorization of service use against any prepaid balances.

The revenue generation module can define revenue share agreements (e.g., percentage based, fixed fee; combination)

The revenue generation module can enable telecommunication network service for a customer. The revenue generation module can create and manage service, provide service activation and deactivation. The revenue generation module can provide provisioning and maintain information related to device use on the telecommunication network.

The revenue generation module can configure new services and service-related attributes with a graphical user interface. The revenue generation module can outline service usage record formats with spreadsheet-like interface. The revenue generation module can configure provisioning tags for incorporation into the service order. The revenue generation module can support synchronous and asynchronous workflow. The revenue generation module can define monetary and non-monetary resources (e.g., U.S. dollars, Euros, number of free downloads, ringtones purchased)

Revenue Capture Module

The revenue capture module can maximize market share using competitive pricing models and flexible balance and credit control to enable any service for any subscriber. As network services are authorized by the revenue management system and consumed by the user, transaction data are captured, rated, discounted, and charged by the revenue capture module while balances are managed. Real-time interactions reduce the risk of revenue leakage, improve customer satisfaction, and encourage usage.

The revenue capture module can authorization telecommunication network service. The revenue capture module can authenticate customers and authorize service and guide transactions through network integration. The revenue capture module can integrate the revenue management system to network elements through an API framework.

The revenue capture module can preauthorize service usage according to data stored in the database in real-time. The revenue capture module can prerate transactions according to the subscriber's current service plans and up-to-date real-time balances, without impacting the actual balance. The revenue capture module can provide—advice of charge (AoC) to the subscriber, for example, so the subscriber knows what they are paying prior to the charge against an account balance.

The revenue capture module can work in conjunction with a balance management module to reserve balances as defined by the service provider (e.g., prepaid content delivery). The revenue capture module can analyze, classify, enhance, split, and assemble transactions prior to rating. The revenue capture module can integrate network elements directly or via mediation devices for event collection.

The revenue capture module can map external service codes in event records to internal service codes, service classes, and usage classes. The revenue capture module can normalize event records to an internal, extensible format. The revenue capture module can validate all data fields to ensure data integrity. The revenue capture module can assemble multiple event records into a single event for rating. The revenue capture module can split event records into multiple copies for distribution to multiple processing streams or external systems (e.g., for fraud management). The revenue capture module can skip or discard records according to rules defined by the prepaid wireless service provider.

The revenue capture module can guide usage records to the appropriate billable account. The revenue capture module can enrich the event records with data from external sources (e.g., birthdays, closed user group indicators).

The revenue capture module can rate and discount transactions and revenue share using monetary and non-monetary resources. The revenue capture module can identify pricing and discounting as defined for the subscriber and execute the pricing and discounting on the subscriber's account. The revenue capture module can support real-time transactional rating (e.g., often required for prepaid services) as well as high-speed near real-time batch processing. The revenue capture module can define an unlimited number of chargeable event types by using an included GUI.

The revenue capture module can manage account balances, such as monitor resource availability, manage reservations, maintain thresholds, and charge transactions. The revenue capture module can support currency and non-currency balances. The revenue capture module can monitor user-configured balance thresholds and send events to other systems for processing. The revenue capture module can define balance rollover rules for any balance (e.g., monthly plan minutes). The revenue capture module can configure one or more balance groups at the account or service level for a subscriber. The revenue capture module can reserve portions of balances in real-time, as services are requested, for example, in order to support simultaneous use of a balance group without leakage or balance overruns. The revenue capture module can validate usage for application by a potential subscriber against a balance or multiple balances.

Revenue Collection Module

The revenue collection module can ensure bills and invoices are generated and appropriate monies are collected from the correct debtors. The revenue collection module can post to accounts receivables and general ledgers accounts while handling all payments terms, settlements, and disputes to ensure an accurate accounting of all revenue. The revenue collection module can produce a real-time, accurate view of revenue, for example, providing insight to customer profitability as well as the health of the business, while enabling the provider to respond more quickly to changing market dynamics.

The revenue collection module can aggregate all the bill items and perform the cycle-end billing process. The revenue collection module can apply billing time discounts based on aggregated volumes, calculating rollovers, granting and resetting of resources, performing resource conversion (i.e., folds), applying deferred taxes, applying cycle charges, or combinations thereof. The revenue collection module can utilize non-cyclical billing options for billing subscribers immediately for current charges, for one-time purchases, in advance of service being delivered, or combinations thereof.

The revenue collection module can generate one or more bills for corporate hierarchies. The revenue collection module can calculate taxes through integration with an external application or service provider (e.g., Billsoft Vertex, Worldtax Intl.). The revenue collection module can configure invoice formats in XMUXSL or utilize external invoicing software such as DOC1. The revenue collection module can generate hard and soft copy invoices.

The revenue collection module can manage general ledgers and integrate with EW systems. The revenue collection module can selectively allow service representatives to manage desired functions, for example issuing credits, handling disputes, adjustments, top-ups, refunds, or combinations thereof.

The revenue collection module can support multiple currencies. The revenue collection module can support traditional general ledger accounting through the use of a General Ledger (GIL) interface. The revenue collection module can track revenue in accordance with generally accepted accounting principals (GAAP). The revenue collection module can have an API integration to Financial EW systems such as those from SAP or Oracle.

The revenue collection module can process payments and vouchers and integrate to payment gateways. The revenue collection module can support multiple payments methods, for example, credit card, debit card, cash, check, prepaid, or combinations thereof. The revenue collection module can allow subscribers to utilize multiple payment methods per account.

The revenue collection module can have prebuilt interfaces to several third party clearinghouses (e.g., Paymentech, Bertelsmann-payment API framework) to quickly integrate to other payment centers.

The revenue collection module can have GUIs for supporting processing of incoming payments. The revenue collection module can have complete voucher management, from voucher ordering through usage of the voucher. The revenue collection module can manage accounts for multi-service, multi-balance vouchers. The revenue collection module can create voucher accounts that top up multiple currency/non-currency balances for one or more services.

According to one embodiment, payment suspense management can be provided. Payments that cannot be applied, for example due to open issues raised during the payment validation process, can be directed to the payment suspense management process.

A payment suspense account can be introduced into the system that allows payments to be kept in a suspended state. The payment suspense account can be excluded from the billing process. Payments posted to the payment suspense account can be posted as unallocated payments.

Payments can stay in suspense and can be guided manually to the correct accounts. A payment suspense GUI tool can be provided to handle payments while accounts are in suspense.

Once a payment is successfully recycled from payment suspense management, it can be posted to the appropriate account and the suspended payment can be reversed from suspense. If payments fail validation during the payment recycling process, a new payment can be created in suspense and the old one can be reversed. this can allow auditing of the changed information for the suspended payment.

The revenue collection module can support sponsored charges for usage paid for by a third party (e.g., corporation, advertiser, gift)

The revenue collection module can have accounts payable and net settlements calculations, integrate with clearing houses, and provide settlements for roaming, content, and resellers. The revenue collection module can define revenue share agreements as part of complete partner management.

The revenue collection module can manage partner arrangements, such as sharing revenues according to multiple methods, such as percentage based sharing, fixed fee sharing, per transaction sharing, volume/tier sharing, aggregations, or combinations thereof.

The revenue collection module can support accounting for roaming, network, interconnect, content, reseller, and other partners. The revenue collection module can connect to third party content in real-time for service preauthorization and settlement. The revenue collection module can provide complete support for roaming standards-TAP3 and CIBER. The revenue collection module can calculate net settlements. The revenue collection module can generate partner invoices.

Revenue Analysis Module

The revenue analysis module can provides real-time verification, reporting, analysis, and control of all events and actions which helps maximize revenue and minimize loss associated with fraud and revenue leakage. Understanding the revenue relationships with customers and partners improves their satisfaction. Revenue Analysis ensures all transactions are conducted with the fullest possible control, integrity, and completeness.

The revenue analysis module can provide data consistency, redundant processes, system high-availability, and transactional completeness. The revenue analysis module can have automated monitoring and notification to the service provider and/or the subscriber. The revenue analysis module can perform error analysis on the subscriber accounts.

The revenue analysis module can check various control points in the event processing process to check various expected parameters. The revenue analysis module can perform a real-time audit trail of all activity The revenue analysis module can track and record CSRs actions, incoming usage, payment processing, web-self-care requests, or combinations thereof. The revenue analysis module can automatically, or can enable manual control by the service provider to, review and edit erred or potentially fraudulent event records from various network and partner sources. The revenue analysis module can re-rate usage when errors are found in how usage was processed.

The revenue analysis module can provide reporting on invoice and bill reconciliation. The revenue analysis module can provide interactive and dynamic reporting, and notification. The revenue analysis module can provide complete report design and scheduling framework. The revenue analysis module can use prebuilt report templates provided for sales, marketing, accounting and finance data. The revenue analysis module can access any data in the database, including user-defined fields. The revenue analysis module can export report data streams to other applications in XML format.

The revenue analysis module can have a revenue intelligence module (i.e., a sub-module). The revenue intelligence module can perform "what if" revenue simulations and multiple re-ratings to deliver real-time pricing optimizations. The revenue intelligence module can similarly provide data to predict churn, revenue and margin, and customer lifetime values.

The revenue intelligence module can calculate the effect of new product pricing versus existing pricing or the competition's pricing. This can include taking multiple service bundles and convergent services into account. The revenue intelligence module can increase availability of information regarding business profitability or future margin opportunities of new services. The revenue intelligence module Address market elasticity to maximize' margins For example. there maybe a five, percent shift in customer base to another price plan as a result of a marketing campaign. Or the introduction of a new service may move 10 percent of calls in Zone X to this new service in Zone Z. Improve the capability to negotiate changes in the value chain.

The revenue intelligence module can calculate an account holder's lifetime value and margin Relationship. For example, if the account holder contacts a service representative, the service representative can access the revenue intelligence module and receive an analysis of the account holder's lifetime value and margin relationship. The service representative can then propose—according to actual customer behavior—a price plan for the account holder that is in full alignment with the service provider's business objectives.

The revenue intelligence module can be used to determine an individual customer's impact on profitability, how many (and what type of) customers are gained or lost per month, and the average cost of bringing new customers onboard. The revenue intelligence module can provide the ability to calculate costs per-customer of various price plans using aggregated call behavior from customer data (or event data records).

The revenue intelligence module can analyze the fiscal success of applying discounts (including cross discounts), free units of all types, market elasticity, and other seasonal effects. Service providers can then offer customers service packages that will enhance the service relationship (i.e., leading to increased revenue potential from that customer and increased customer satisfaction).

The revenue intelligence module can enable service providers to detect and respond to changes in interconnection costs between international regions. The revenue intelligence module can use simulation engines to audit all vendor invoices, perform profitability comparisons between buy rates versus sell rates, and perform simulations on the current customer base with complex discounting programs and price elasticity.

The revenue intelligence module can decrease the time to effectively roll-out a new price plan by a service provider. Price plan introductions involve five steps: a creation phase including brainstorm and developing ideas using general targeted customer segment; a customer segment identification phase identifying which customers are most likely to accept the new price plan, evaluating competitive offers, and ensuring the target corresponds with original ideas in the creation phase; an interconnection plan identification phase including reviewing default interconnection price plans and performing interconnection partner pre-optimization; a profitability testing phase utilizing the expected service usage (and/or based on real usage), and calculating the cost for the subscriber of the service as well as for the service providers.

For customers with low or negative margin, their characteristics (especially actual call behavior, contract and demographic data) must be analyzed to identify and minimize any financial risk. Next, informed decisions can be made whether to follow the assumptions, tune the service costs, or to accept a known risk.

The customer segment identification phase, an interconnection plan identification phase, and profitability testing phase remain a closed loop until consensus is achieved. If the data during analysis is poor, each approximation made working with averages or skipping steps to save time may entirely compromise the profitability of the new price plan or service.

The revenue intelligence module can be configured to perform customer segment identification, interconnection plan identification, and profitability testing. Therefore, the revenue intelligence module can improve data quality and reduce the time spent (e.g., by automating analysis and making results immediately available to decision makers) in the customer segment identification phase, interconnection plan identification phase, and profitability testing phase.

Instantaneously determined by the revenue intelligence module based on real-time data for any given customer segment defined within databases to which the module has access. Within hours. the proposal's effect on the entire customer base can be identified. This enables informed decisions to be made based on call behavior that will optimize costs in alignment with returns. Alternatively. when a new interconnect tariff is launched, Revenue Intelligence enables product managers to immediately determine the best average interconnection cost for all the customers in the price plan and generate a list of current and best price plan costs per customer, providing the ability to change only price plans that will deliver results.

Integration Modules

The revenue management system can be configured to easily integrate with other computer hardware and/or software systems. The revenue management system can be configured to integrate, and can be integrated, with an internet integration application, for example, Microsoft.Net Integration. The internet integration application can enable the revenue management system to easily integrate with any enterprise application integration (EAI) middleware and allows third-party enterprise applications to access the revenue management system through the use of web services. For this particular enhancement, the web services can be created using the internet integration application platform.

The revenue management system can be configured to integrate, and can be integrated, with a business process transaction integration application, for example Microsoft BizTalk Adapter. The business process transaction integration application feature can enable EAI with the revenue management system on the business process transaction integration application platform. The business process transaction integration application can enable third-party enterprise applications to integrate with the revenue management system and orchestrate business process transactions with the revenue management system platform. The business process transaction integration application can enable any application to map its process definitions and workflow using the web services framework and enables the revenue management system to push documents into business process transaction integration application.

The revenue management system can be configured to integrate, and can be integrated, with an external database revenue management application, for example, SAP RM-CA or Siebel TelcoOne. The integrated revenue management system and application can provide total visibility and fully integrated control of customer transactions from rating, billing, and accounts receivables including electronic bill presentment and payment to general ledger accounting and controlling. The integrated revenue management system and application can provide full control of the financial relationship with customers. The integrated revenue management system and application can control bad debt risk through the enforcing of accountholder credit limits. The integrated revenue management system and application can reduce days sales outstanding (DSO) through efficient management of collections and dispute processes. The integrated revenue management system and application can increase flexibility for customers by supporting additional payment options and payment plans. The integrated revenue management system and application can increase the efficiency of tracking and reporting of general ledger data by leveraging the synchronization between the applications. The integrated revenue management system and application can provide quicker response to customer inquiries through real-time retrieval of invoices.

Architecture

The revenue management system can have a system architecture. The system architecture can have a network layer. The network layer can deliver the voice, data, messaging, and content services to the end users. The network layer can handle all standard network signaling (e.g. SS7, CAMEL, WIN), call control, session management, and IVR function associated with individual service requests. The network layer can interact with the Authentication, Authorization & Accounting (AAA) Layer during specific trigger points to authorize or reauthorize use of a service.

The AAA layer can provide AAA protocol mediation and detect failures at the revenue capture layer (on which the revenue capture module can execute), for example, for prepaid services. Network elements in the network layer can communicate via various protocols including Diameter, Radius, OSA/Pariay, and proprietary methods over TCP/IP or UDP. The AAA layer can translate these requests into API calls to the revenue capture layer. The AAA layer can be responsible for providing 99.999% service availability by detecting revenue capture module failures in processing requests bound for that module locally according to user-defined business rules.

In the revenue management system, the AAA layer can be managed by a AAA gateway. The AAA gateway can facilitate high-speed protocol translation to the network layer (network elements to AAA Gateway), mapping of asynchronous protocols to synchronous protocols, measuring and guaranteeing the latency service levels for the prepaid backend, failure detection for the revenue capture layer, failure handling by providing a degraded mode and an interim request storage facility, failure recovery by replaying requests into the revenue capture module, and combinations thereof.

The revenue capture layer can support the processing of authentication and authorization requests coming from the AAA layer (i.e., Access Control), prerating against current balances (e.g., as part of service authorization) to make sure the account holder has enough funds, reserving portions of the balances (e.g., as part of service authorization) to ensure simultaneous use of a balance for multiple services does not cause leakage, enriching event record information prior to rating for more complex rating and discounting schemes, rating accounting records once the service or transaction has been completed, applying various types of discounts, charging the service usage or transaction against the current set of balances, and combinations thereof.

The AAA gateway can communicate to the revenue capture layer using TCP/IP and/or the PCP (Portal Communication Protocol) and/or the Application Programmer Interface (API).

A central revenue management layer can be in communication with the revenue capture layer. The central revenue management layer can execute the revenue generation, revenue collection, and revenue analysis modules described supra. The central revenue management layer can be fully supported in a revenue management platform. The central revenue management layer can be the persistent data store for all required data objects from the revenue capture layer (e.g., customer information, pricing information, rated records, balances). The central revenue management layer can communicate with the revenue capture layer when stored data objects must be refreshed.

The AAA gateway can communicate with the network layer by means of the TCP/IP or UDP protocols. The protocol used for this communication can be Diameter or Parlay, HP MBI, or a proprietary protocol.

The AAA Gateway's front end to the network layer is asynchronous. That is, requests are received from the network layer and acknowledged upon receipt. Once the operation requested is completed, the AAA gateway sends a response to the calling network element within the network layer with the results. The AAA gateway, in processing the requests from the network layer, can act as a high speed protocol translator to the revenue capture layer while also making the conversion from asynchronous to synchronous translation.

The incoming requests can. be queued to "pipelines" specialized for each AAA operation. Since the network elements can include timeout or retry mechanisms, some duplicate detection is handled with the AAA Gateway. The AAA Gateway can be stateless (i.e., the states are not persisted and do not survive a crash), the final duplicate/fraud detection can be performed in the revenue capture layer.

The AAA gateway's backend can have a pool of TCP/IP connections to the revenue capture layer. This configurable number of connections can be established at startup and can remain established for the life of the gateway process. The communication between the AAA gateway and the revenue capture layer can be synchronous. That is, each connection to the revenue capture layer can remain blocked until the results of the operation are returned to the AAA gateway.

Once these results are available, the results are translated back to the network layer protocol and forwarded to the calling network element to complete the request. The AAA gateway can connect via TCP/IP to the revenue capture layer, for example, in a method identical to the rest of the clients (e.g. Pricing Center). Clients and RCP can communicate by PCP (Portal Communication Protocol). A client can invoke operations in the revenue capture layer by calling the open API.

The AAA gateway can be the interface to all network elements including service control points (SCPs—call control and signaling primarily for prepaid voice services) for voice service delivery. The SCP can handle all signaling and call control associated with call setup, monitoring, and teardown. The AAA gateway can support communicating to the SCP in both standard and proprietary protocols. This can include the ability to support multiple protocols from a single instance of the AAA gateway.

For example, prior to the start of a call originated from a GSM or CDMA network, a Mobile Switching Center (MSC) in a Service Network can queries the SCP for call origination instructions and call authorization. The SCP can forward the authorization request to the AAA gateway, which in turn can call the APIs to request authorization from the revenue capture layer.

At this paint, there are a number of different checks that the revenue capture layer can make, many of which are configurable by the service provider. For example, the revenue capture layer can validate the caller identification, services available, and balances. The revenue capture layer can perform reverse rating to determine how long the caller can remain connected based on current monetary and non-monetary funds in the caller's account. The reverse rating can account for the subscriber's pricing plan, including all discounts, without impacting the subscriber's balance.

Following reverse rating, the revenue capture layer can create a reservation to set aside a portion of one or more balances to be used for the service being requested. The revenue capture layer ca have a resource reservation framework for reserving resources. Resource reservation reduce risk when can allow a customer to access multiple concurrent network services and charge these services against a single account balance without leakage. Resource reservations can be made on multiple balances (e.g., free SMS Balance, and Euro balance) and multiple types of balances (e.g., monetary and non-monetary). The revenue management system can. create, extend, associate, and release resource reservations. The service provider can also customize resource reservation rules for its revenue management system.

Once the reservation is established, a response can be forwarded back to the service network and the call can be connected. If the call approaches the length of the reservation, the SCP can request additional funds be reserved for the call in order to continue the call. Reauthorizations can occur like the original authorizations.

Once the call is disconnected by the calling or called party, the service network can inform the SCP. The SCP can notify the AAA gateway of the end of the voice call session. The revenue capture layer can receive this notification from the AAA gateway and end the session and the transaction before forwarding on to the centralized revenue management layer.

The revenue management layer can persistently store (e.g., in a cache and/or in the database) all rated event information in addition to the other data mentioned herein (e.g., customer data, pricing data). The revenue management layer can persistently copy the subscriber's set of balances. Therefore, the rated event impact is made onto the subscriber's set of balances prior to returning an acknowledgement back to the revenue capture layer.

Once the revenue capture layer receives this acknowledgement, the balances can be updated in local memory and the reservation can be released.

The integration between a data control point (DCP—a network element that interfaces to GGSNs (GPRS) and PDSNs (CCMA 1X) to handle session management and teardown for data sessions) and the revenue management system can be essentially the same as for voice calls as for SCPs except the integration is to the DCP instead of the SCP. The AAA gateway can support the chosen protocol (e.g., Radius, Diameter, HP MBI, proprietary) and forwards requests to the revenue capture layer via the API interface.

In an example of simultaneous service usage with resource reservation, the DCP can monitor traffic and service requests over a high-speed data transport such as GPRS or CDMA 1X. The DCP then recognizes a request for the mobile e-mail service. The DCP can invoke an authorization request to the AAA gateway. The AAA gateway can then call the APIs to request authorization from the revenue capture layer.

The subscriber can have a non-monetary balance for mobile a-mail downloads. The revenue capture layer can run through a number of verifications and the business logic before reserving 200 Kbytes for email download. The DCP can be informed of the threshold and monitor the e-mail traffic flow. While downloading e-mail, the subscriber can decide to listen to streaming audio, for example. The DCP can request authorization from the revenue capture layer using the same process as noted before. The revenue capture layer can reserve 20 minutes of streaming audio resource before responding back to the DCP.

After downloading a number of e-mail messages, the DCP can surpass a reauthorization threshold and attempt to request additional funds or resources form the revenue capture layer. In this case, however, there are no additional balances available for e-mail downloads and a denial is returned. The subscriber is allowed to continue service until the remaining portion of the original 200 Kbytes is used. In this scenario, the remaining portion of the balance that was allocated to the email downloads is utilized.

There are a number of options at this point for how the service provider may wish to handle the scenario including redirecting the subscriber to a self-care web site, requesting balance top-up, etc. The usage up to this point can also be rated with balance updates by passing a usage event record from the DCP to the revenue capture layer for processing.

The management revenue system can be used to manage accounts for voice or non-voice wireless services, for example GPRS, Wi-Fi, SMS, and MMS.

The management revenue system can be used for managing revenue distribution for partner programs. For example, a prepaid wireless subscriber can visit a content partner web site and request to purchase a piece of content (e.g., screensaver, audio clip, etc.). A content server can use a CDK to request authorization from the revenue control layer, including a check of the pending charge versus existing funds. In this example, the revenue control layer can rate third party content, so the revenue control layer can return the AoC amount as part of the response.

The third party content can be rated with the revenue control layer, or the content provider can provide rated usage records, or both. Afterwards, the AoC is accepted to the subscriber via a service network and the content is downloaded. Upon successful download, the content server forwards a usage event record to the revenue control layer, which rates it. After rating, the event is passed to the revenue management layer, which updates the balances and stores the rated record in persistent storage. The successful response is returned to the revenue control layer which updates the balances in local memory and releases any reservation that may have been made previously.

Revenue sharing and settlement for content partners can be handled in the revenue management layer, where there are various options on splitting revenues and settlement. The same process can apply regardless of payment method.

The revenue management system can be integrated with a provisioning platform, for example for GSM and CDMA-based services. The integration or communication from the revenue management system to the provisioning platform can be through a provisioning framework of the revenue management system.

During an account creation, update, or deletion, the provisioning framework can generate a provisioning payload and pushes the payload over a TCP/IP interface. The provisioning work order payload that is generated and sent is created in an XML format. The provisioning payload can be configurable and enables attributes from the account, service, or device associations to be contained in the XML payload. The provisioning framework comes with a simulator so that the interface can be easily tested.

The revenue management system can be integrated with a mediation platform. The mediation platform can be connected to the network elements. The revenue management system can be integrated to the mediation platforms many times for wireless services, primarily by the mediation device calling the APIs or by delivering batch files to dedicated directories. The mediation device can perform the event collection from the network element and deliver the usage in raw format to the revenue management system, which in turn can perform any number of event enrichment functions available before rating, discounting, and balance management.

The revenue management system can support traditional general ledger accounting through the use of a General Ledger (G/L) interface. G/L account codes can be assigned to balance impacts through a configuration file or through a pricing center. As balance debits and credit occur, the corresponding G/L accounts can be affected. G/L account codes can be assigned to both rated and pre-rated events. Summaries of G/L account impacts can be viewed via standard reports or be exported into external G/L systems. The revenue management system can be integrated to G/L systems (e.g., G/L systems by SAP, Oracle, Peoplesoft, and others).

The revenue management system can be integrated to payment gateways or clearinghouses, for example Paymentech, Bertelsmann (e.g., using Oliva and Financial Information Accounting System (FIAS)), or directly with banks. The revenue management system can directly debit funds from the payment gateways or clearinghouses including the use of credit cards. The connections to the clearinghouse may be online or batch.

The back-end of the revenue management system can be a relational database used for persistent storage. The database can be an Oracle and/or Microsoft SQL server. Standard SQL queries can be executed on the database to extract data, including objects and attributes that may have been incorporated as part of a service provider specific solution.

Any elements described herein as singular can be pluralized (i.e., anything described as "one" can be more than one). Any species element of a genus element can have the characteristics or elements of any other species element of that genus. The above-described configurations, elements or complete assemblies and methods and their elements for carrying out the invention, and variations of aspects of the invention can be combined and modified with each other in any combination.

We claim:

1. A method of applying a payment for services in a revenue management system of a telecommunication network, the method comprising:

receiving at the revenue management system requests for services from a plurality of end users via a telecommunications network, the plurality of end users associated with a customer account and including at least one end user billed for services on a pre-paid usage model and at least one user billed for services on a post-paid usage model;

requesting authentication of each end user and authorization of each service requested by a revenue capture module of the revenue management system;

authenticating each end user with the revenue capture module based on customer account information maintained by the revenue management system;

authorizing each service requested with the revenue capture module in real time based on the customer account information;

charging the customer account with the revenue capture module for each service provided in response to each request;

receiving at a revenue collection module of the revenue management system, a payment on customer account;

performing a validation process on information related to the payment with the revenue collection module; and in response to a failure of the validation process indicating a failure to validate the information related to the payment, suspending the payment with the revenue collection module, wherein suspending the payment comprises recording the payment in a suspense account and excluding the suspense account from a billing process.

2. The method of claim 1, further comprising posting the suspense account to an accounting ledger as an unallocated payment.

3. The method of claim 1, further comprising applying the payment to an account indicated by a user.

4. The method of claim 1, further comprising recycling the payment through the validation process.

5. The method of claim 4, further comprising, in response to a success of the validation process, posting the payment to an indicated account and reversing the recording the payment in the suspense account.

6. A system for applying a payment for services in a revenue management system of a telecommunication network, the system comprising:

a network layer including a telecommunications network adapted to deliver communication services to each of a plurality of end users, the plurality of end users associated with a customer account and including at least one end user billed for services on a pre-paid usage model and at least one user billed for services on a post-paid usage model;

a gateway layer communicatively coupled with the network layer and adapted to receive requests for services from each end user via the network layer and request authentication of each end user and authorization of each service requested;

a revenue capture layer communicatively coupled with the gateway layer and adapted to receive the requests for authentication of the end users and authorization of the services requested from the gateway layer and perform authentication of the end users and authorization of the services requested; and a revenue management layer communicatively coupled with the revenue capture layer and adapted to maintain one or more data stores of information including account information for the customer account and pricing information for the communication services, wherein the revenue capture layer performs authentication of the end users based on the account information and performs authorization of the service requested based on the account information and the pricing information for the communication services; and a revenue capture layer communicatively coupled with the telecommunication network and adapted to receive a payment on the customer account, perform a validation process on information related to the payment, and in response to a failure of the validation process indicating a failure to validate the information related to the payment, suspending the payment, wherein suspending the payment comprises recording the payment in a suspense account and excluding the suspense account from a billing process.

7. The system of claim 6, further comprising posting the suspense account to an accounting ledger as an unallocated payment.

8. The system of claim 6, further comprising applying the payment to an account indicated by a user.

9. The system of claim 6, further comprising recycling the payment through the validation process.

10. The system of claim 9, further comprising, in response to a success of the validation process, posting the payment to an indicated account and reversing the recording the payment in the suspense account.

\* \* \* \* \*

UNITED STATES PATENT AND TRADEMARK OFFICE
CERTIFICATE OF CORRECTION

| | |
|---|---|
| PATENT NO. | : 8,462,923 B2 |
| APPLICATION NO. | : 11/760519 |
| DATED | : June 11, 2013 |
| INVENTOR(S) | : Krishnamoorthy et al. |

It is certified that error appears in the above-identified patent and that said Letters Patent is hereby corrected as shown below:

On the Title Page

On third page, column 2, References Cited under other publications, line 18, delete "malied" and insert -- mailed --, therefor.

On third page, column 2, References Cited under other publications, line 68, delete "Standasrds" and insert -- Standards --, therefor.

In the Specification

In column 2, line 36, delete "fall" and insert -- full --, therefor.

In column 3, line 53, delete ")" and insert -- ). --, therefor.

In column 5, line 20, delete "Billsoft" and insert -- Billsoft, --, therefor.

In column 5, line 36, delete "principals" and insert -- principles --, therefor.

In column 6, line 9, delete "reversed. this" and insert -- reversed. This --, therefor.

In column 6, line 13, delete ")" and insert -- ). --, therefor.

In column 6, line 51, delete "activity" and insert -- activity. --, therefor.

In column 7, line 18, delete "margins" and insert -- margins. --, therefor.

In column 7, line 18, delete "example." and insert -- example --, therefor.

Signed and Sealed this
First Day of September, 2015

Michelle K. Lee
*Director of the United States Patent and Trademark Office*

CERTIFICATE OF CORRECTION (continued)
U.S. Pat. No. 8,462,923 B2

In column 7, line 19, delete "maybe" and insert -- may be --, therefor.

In column 8, line 26, delete "hours." and insert -- hours --, therefor.

In column 8, line 29, delete "Alternatively." and insert -- Alternatively --, therefor.

In column 9, line 40, delete "Pariay" and insert -- Parlay --, therefor.

In column 10, line 32, delete "can." and insert -- can --, therefor.

In column 11, line 5, delete "paint" and insert -- point --, therefor.

In column 11, line 25, delete "can." and insert -- can --, therefor.

In column 12, line 2, delete "a-mail" and insert -- e-mail --, therefor.